(12) United States Patent
Wallman (10) Patent No.: US 6,516,303 B1
(45) Date of Patent: *Feb. 4, 2003

(54) METHOD, SYSTEM, AND APPARATUS FOR MANAGING TAXABLE EVENTS WITHIN A PORTFOLIO

(75) Inventor: Steven M. H. Wallman, Great Falls, VA (US)

(73) Assignee: FOLIOfn, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/688,975

(22) Filed: Oct. 17, 2000

Related U.S. Application Data (63) Continuation of application No. 09/153,143, filed on Sep. 14, 1998, now Pat. No. 6,161,098.

(51) Int. Cl.[7] .............................................. G06F 17/60
(52) U.S. Cl. ........................................... 705/36; 705/37
(58) Field of Search ........................ 705/30, 31, 35–37

(56) References Cited

U.S. PATENT DOCUMENTS

| | | | | |
|---|---|---|---|---|
| 4,346,442 A | * | 8/1982 | Musmanno | 364/408 |
| 4,376,978 A | * | 3/1983 | Musmanno | 364/408 |
| 4,566,066 A | * | 1/1986 | Towers | 364/408 |
| 4,597,046 A | * | 6/1986 | Musmanno et al. | 364/408 |
| 4,642,768 A | * | 2/1987 | Roberts | 364/408 |
| 4,648,038 A | * | 3/1987 | Roberts et al. | 364/408 |
| 4,674,044 A | * | 6/1987 | Kalmus et al. | 364/408 |
| 4,750,121 A | * | 6/1988 | Halley et al. | 364/408 |
| 4,751,640 A | * | 6/1988 | Lucas et al. | 364/408 |
| 4,774,663 A | * | 9/1988 | Musmanno et al. | 364/408 |

(List continued on next page.)

FOREIGN PATENT DOCUMENTS

| | | | |
|---|---|---|---|
| WO | WO 98/44443 | * | 10/1998 |
| WO | WO 98/44444 | * | 10/1998 |
| WO | WO 99/28845 | * | 6/1999 |
| WO | WO 99/46658 | * | 9/1999 |

OTHER PUBLICATIONS

Sages, Ronald A. & Michael H. Keden, "Supercharging Popular Wealth Transfer Planning Vehicles," Trusts & Estates, vol. 135 No. 9, pp. 45–62.*

"August Trade News: New Releases & Products," dated Aug., 1996, Retrieved on Dec. 2, 1999 from the Internet <URL http://www.traders.com/Documentation/FEEDbk_docs/Archive/0896/0896tradenews.html>.*

Jaroslovsky, Rich, "Finance at Your Fingertips," Modern Maturity, vol. 38, No. 4, pp. 54–57.*

Hogan, Mike, "Plan to Retire with Confidence," PC/Computing, vol. 8, No. 7, p. 77(1).*

Kirsch, Clifford E., Wendell M. Faria, & W. Thomas Conner, "Mutual Fund and Variable Insurance Products Performance Advertising," Business Lawyer, vol. 50, No. 3, pp. 925–993.*

McCollum, Tim, "Adding Some Byte to Retirement Plans," Nation's Business, vol. 85, No. 5, pp. 52–55.*

Tapellini, Donna & Eileen McCooey, "Tackled Your Checkbook? It's Time to Move On," Windows Magazine, No. 705, p. 176.*

(List continued on next page.)

*Primary Examiner*—Tariq R. Hafiz
*Assistant Examiner*—Susanna Meinecke-Diaz
(74) *Attorney, Agent, or Firm*—Kenyon & Kenyon (57) ABSTRACT

A method is disclosed for providing management of taxable events. The disclosed method includes determining a proceeds and tax consequence that would result from trading each of various combinations of a plurality of assets/liabilities. The disclosed method further includes displaying the proceeds and tax consequence from each potential trade in a computer-generated graph of at least two dimensions.

41 Claims, 7 Drawing Sheets

U.S. PATENT DOCUMENTS

| | | | | |
|---|---|---|---|---|
| 4,910,676 A | * | 3/1990 | Alldredge | 364/408 |
| 4,933,842 A | * | 6/1990 | Durbin et al. | 364/408 |
| 4,953,085 A | * | 8/1990 | Atkins | 364/408 |
| 4,980,826 A | * | 12/1990 | Wagner | 364/408 |
| 4,989,141 A | * | 1/1991 | Lyons et al. | 364/408 |
| 4,994,964 A | * | 2/1991 | Wolfberg et al. | 364/408 |
| 5,038,284 A | * | 8/1991 | Kramer | 364/408 |
| 5,101,353 A | * | 3/1992 | Lupien et al. | 364/408 |
| 5,126,936 A | * | 6/1992 | Champion et al. | 364/408 |
| 5,132,899 A | * | 7/1992 | Fox | 364/408 |
| 5,148,365 A | * | 9/1992 | Dembo | 364/408 |
| 5,193,056 A | * | 3/1993 | Boes | 364/408 |
| 5,202,827 A | * | 4/1993 | Sober | 364/408 |
| 5,210,687 A | * | 5/1993 | Wolfberg et al. | 364/408 |
| 5,214,579 A | * | 5/1993 | Wolfberg et al. | 364/408 |
| 5,220,500 A | * | 6/1993 | Baird et al. | 364/408 |
| 5,227,967 A | * | 7/1993 | Bailey | 364/408 |
| 5,262,942 A | * | 11/1993 | Earle | 364/408 |
| 5,270,922 A | * | 12/1993 | Higgins | 364/408 |
| 5,297,032 A | * | 3/1994 | Trojan et al. | 364/408 |
| 5,375,055 A | * | 12/1994 | Togher et al. | 364/408 |
| 5,497,317 A | * | 3/1996 | Hawkins et al. | 364/408 |
| 5,517,406 A | * | 5/1996 | Harris et al. | 364/408 |
| 5,649,116 A | * | 7/1997 | McCoy et al. | 395/238 |
| 5,664,115 A | * | 9/1997 | Fraser | 705/37 |
| 5,671,363 A | * | 9/1997 | Cristofich et al. | 395/237 |
| 5,689,650 A | * | 11/1997 | McClelland et al. | 395/236 |
| 5,704,045 A | * | 12/1997 | King et al. | 395/235 |
| 5,710,889 A | * | 1/1998 | Clark et al. | 395/244 |
| 5,724,524 A | * | 3/1998 | Hunt et al. | 395/237 |
| 5,727,161 A | * | 3/1998 | Purcell, Jr. | 395/207 |
| 5,729,700 A | * | 3/1998 | Melnikoff | 395/236 |
| 5,745,706 A | * | 4/1998 | Wolfberg et al. | 395/235 |
| 5,749,077 A | * | 5/1998 | Campbell | 705/36 |
| 5,758,097 A | * | 5/1998 | Debe et al. | 395/235 |
| 5,761,441 A | * | 6/1998 | Bennett | 395/235 |
| 5,761,442 A | * | 6/1998 | Barr et al. | 395/236 |
| 5,765,141 A | * | 6/1998 | Spector | 705/14 |
| 5,774,881 A | * | 6/1998 | Friend et al. | 705/36 |
| 5,784,696 A | * | 7/1998 | Melnikoff | 705/36 |
| 5,794,219 A | * | 8/1998 | Brown | 705/37 |
| 5,799,287 A | * | 8/1998 | Dembo | 705/36 |
| 5,806,047 A | * | 9/1998 | Hackel et al. | 705/36 |
| 5,806,049 A | * | 9/1998 | Petruzzi | 705/36 |
| 5,812,987 A | * | 9/1998 | Luskin et al. | 705/36 |
| 5,884,283 A | * | 3/1999 | Manos | 705/30 |
| 5,884,287 A | * | 3/1999 | Edesess | 705/36 |
| 5,918,218 A | * | 6/1999 | Harris et al. | 705/37 |
| 5,930,774 A | * | 7/1999 | Chennault | 705/36 |
| 5,946,666 A | * | 8/1999 | Nevo et al. | 705/36 |
| 5,978,778 A | * | 11/1999 | O'Shaughnessy | 705/36 |
| 6,021,397 A | * | 2/2000 | Jones et al. | 705/36 |
| 6,035,287 A | * | 3/2000 | Stallaert et al. | 705/37 |
| 6,161,098 A | * | 12/2000 | Wallman | 705/36 |
| 2001/0014875 A1 | * | 8/2001 | Young et al. | 705/37 |

OTHER PUBLICATIONS

Downes, John & Jordan Elliot Goodman, Dictionary of Finance and Investment Terms (4th ed.), Barron's Education Series, Inc.*

Barker, Robert. "A Capital–Gains Miracle Worker." Business Week. p. 130. Jan. 31, 2000.*

Tergesen, Anne. "Here Come the E–Funds." Business Week. p. 125. Jan. 31, 2000.*

"1998 ADP Investor Communications Services." ProxyEdge™ 2000.*

"Quicken's 1999 Turbo Tax Deluxe 1040." 59 sheets of various help screen.*

Sherman, D.M., "Expert Systems and ICAI in Tax Law: Killing Two Birds With One AI Stone," Second International Conference on Artificial Intelligence and Law, pp. 74–80.*

Crabb, Don, "Dollars and Sense, 2.0 Lends Speed, Ease of Use," InfoWorld, vol. 8, No. 37, pp. 41–43.*

"Computerized Financial Plans: How Good?," Changing Times, vol. 39, No. 47(5).*

Crowell, Carol A., "Tax Software in Brief; Choosing and Using Tax Software Packages," Creative Computing, vol. 11, p. 37(11).*

"Tax Software," Windows Magazine, vol. 6, No. 14, p. 122.*

Demery, Paul, "Estate Planning: First Anxiety, then Solutions," Practical Accountant, vol. 28, No. 9, pp. 37–41.*

Clolery, Paul, "Boost Your Billings With Estate Planning Software," Practical Account, vol. 27, No. 1, pp. 51–54.*

Jih, W.J.C. & S. Patterson, "An Expert Prototype That Determines Corporate Tax Status and Liabilities," Financial & Accountin Systems, vol. 7, No. 4, pp. 15–19.*

* cited by examiner

FIG.1

| SECURITY | BASIS | NO. SHARES | ACQUISITION DATE | CURRENT PRICE | GAIN | PROCEEDS |
|---|---|---|---|---|---|---|
| 1. X STOCK | 30.00 | 100 | 3/13/90 | 100.00 | 7000 | 10,000 |
| 2. Y STOCK | 50.00 | 100 | 5/15/95 | 80.00 | 3000 | 8,000 |
| 3. Z BOND | 10.00 | 100 | 6/17/96 | 5.00 | (500) | 500 |
| 4. DERIVATIVE M | 100.00 | 100 | 5/20/96 | 5.00 | (9500) | 500 |
| NET | | 400 | | | 0 | 19,000 |

METHOD, SYSTEM, AND APPARATUS FOR MANAGING TAXABLE EVENTS WITHIN A PORTFOLIO

RELATED APPLICATIONS

This is a continuation of U.S. patent application Ser. No. 09/153,143, filed Sep. 14, 1998, U.S. Patent Ser. No. 6,161,098.

The present invention is related to U.S. patent application Ser. Nos. 09/038,158 entitled "Method and Apparatus for Enabling Smaller Investors or Others to Create and Manage a Portfolio of Securities or Other Assets or Liabilities on a Cost Effective Basis" filed on Mar. 11, 1998 and Ser. No. 09/139,020 entitled "Method and Apparatus for Enabling Smaller Investors or Others to Create and Manage a Portfolio of Securities or Other Assets or Liabilities on a Cost Effective Basis" filed on Aug. 24, 1998, which were both filed by the same inventor. U.S. patent application Ser. Nos. 09/038,158 and 09/139,020 are hereby incorporated by reference in their entirety, as if repeated herein, including the drawings.

BACKGROUND OF THE INVENTION

The present invention relates generally to methods and apparatuses for managing portfolios of securities for small investors, and more particularly to a method and apparatus for managing a portfolio of securities for a small investor, in which the small investor is able to measure, test and manage taxable events caused by buying, holding and selling securities within the portfolio.

Currently, investors seeking to transact in securities to obtain a specific tax result such as a certain amount of capital gain or loss must keep track of the specific tax lots of the security they own and then designate the appropriate lots to obtain the desired result, with the broker then required to confirm back to the investor that the specific designated securities have been sold. Often, the paper work, record-keeping and tax analysis required is beyond the means of most smaller investors. The broker or whoever holds the securities must also keep track of the securities as specifically denominated securities so as to be able to track the tax effects and be certain that the correct securities are being sold. If the securities cannot be tracked, then the first-in, first-out method is supposed to be used for calculating taxable gain or loss; for mutual finds, an average basis in the mutual fund shares held by the investor may be and usually is used for such calculation.

An investor buying securities may have both a gain and a loss, or only a gain or only a loss, or no gain or loss, in any particular security. As an example, an investor who purchased 11 lots of 100 shares of Motorola stock over the course of ten weeks at prices of $40, $42, $44 $46, $48, $50, $52, $54, $56, $58 and $60 would have an overall gain on the entire 1100 shares of Motorola if the current price was above $50, an overall loss if the current price was below $50 and no gain or loss if the price was at $50. However, looking at each lot separately, if the current price was $50, the investor would have a gain—if he sold—any of the lots bought for less than $50, a loss—if he sold—any of the lots bought for more than $50 and no gain or loss if he sold the one lot purchased at $50 or the lot bought at $48 along with the lot bought at $52, etc. Similarly, if the current price was $56, the portfolio as a whole would show a gain, but the investor could achieve a loss if he sold at that price only those lots acquired with a tax basis above $56 (i.e., the lots acquired for $58 and $60), and none others or only those that did not eliminate the gain (such as the lot at $56 and the lot at $54 along with the lots at $58 and $60). Obviously, depending on what is sold, the tax results change, as does the amount of cash generated by the transaction. It is very important to investors to be able to control both the cash to be received and the taxes to be paid within the limits of the economic gain and loss they have achieved. If an investor can obtain $100 cash without a taxable gain, then that is worth more (by the amount of the tax bracket times the cash received multiplied by the time value of the money for so long as the tax remains unpaid) than obtaining $100 cash where current taxes need to be paid on that cash.

It is very difficult for an investor to keep track of all these separate lots and results if he has multiple securities bought at a variety of times at different prices, especially when the selling prices of the securities changes frequently, thereby changing the results frequently. Moreover, it is difficult to recognize the relationship between the amount of cash that can be received from the sale and the tax effects, and it is difficult in the case of multiple securities and multiple lots to communicate the information to a broker easily to ensure that the correct securities are sold at the specified prices to effect the desired result.

In a system like the one that is described in U.S. patent application Ser. No. 09/139,020 an investor is permitted easily to engage in strategies such as "dollar averaging" where a small, but constant, amount—such as $100 or $1,000—is invested periodically (e.g., each week or month) in a multitude of securities at whatever the prevailing price may be. In that event, it would be almost impossible for an investor currently to maintain the appropriate tax records and to have a system that would allow the investor to understand the tax and linked cash implications of possible transactions and then obtain the desired tax and cash results, especially where the capital assets being transacted are bought and sold at prices that change frequently (such as securities). In addition, it is very difficult for an investor to understand the remaining available tax-cash positions that result after a change in a complex portfolio due to the sale of selected securities from, or purchase for, the portfolio. In addition, it is very difficult for an investor to understand and manage the tax-cash implications that result from combining potentially short and long term capital asset tax implications with gains and losses and then to be able to obtain the desired tax results by executing transactions that provide the desired results. It is also very difficult for an investor to understand the interactivity of the tax implications from transactions in selected assets with the overall tax results that the investor incurs taking into account other taxes, such as income or other transactions in other assets or liabilities. It is also very difficult for an investor to understand the effects that time will have in converting short-term gains into long-term gains in a plurality of securities or trade lots bought at different times. Finally, it is difficult to determine these tax-ash implications, and their related portfolio implications, in the context of a managed portfolio of assets.

The present invention is therefore directed to the problem of developing a method and apparatus for enabling a small investor with a portfolio of securities to understand and manage the related taxable events and cash implications created by buying and selling securities (which could include mutual funds) in a complex portfolio.

SUMMARY OF THE INVENTION

The present invention solves this problem by providing a presentation and graphical display format directly linked to a system for managing the portfolio of securities enabling the investor easily to make a selection and place an order as to the shares to be sold for the desired cash and tax results.

According to the present invention, a graphical display interface provides the investor with a graph showing, in the event of a sale of selected securities, the cash to be received on, for example, the horizontal axis, and the tax result on, say the vertical axis. The investor is further permitted to click on the discrete points that are available and obtain information as to the specific securities underlying the point. The investor is further permitted to enter orders to effect transactions in those securities.

The points that are available depend on the granularity of the purchases that have been made by the investor—such as how many purchases there were and at how many different prices, and how close together the prices are, etc. The graph is generated by accessing the database, which could be based on records held by a custodian (such as a bank, a broker or some other intermediary), or on the investor's own records, if the investor is keeping track of the information itself. In generating the graph, each point available for selection represents an intersection of a cash and tax result based on the investor's purchases and the current expected sales price for the securities. Once the investor selects his preferred outcome, the system notes those securities that correspond to that outcome for sale. The noted securities are then sold in accordance with the seller's instructions and pursuant to whatever system the seller is using for securities dispositions (if not the invention disclosed in the above mentioned patent applications), with the required confirmations generated by the selling system.

This graphical user interface and connection and linkage to the present invention system or some other record keeping, order handling and execution system resolves the problem of making complex and difficult determinations to achieve a cash-tax goal with a simple and single click of a mouse.

The present invention provides a method for enabling a user to determine the tax consequences from selling multiple assets/liabilities. The method includes the steps of: a) determining the potential tax consequences that would result from trading various combinations of the plurality of assets/liabilities, in which each of the potential tax consequences represents the potential tax consequence that would result from trading one particular subset of assets/liabilities; b) determining the potential proceeds for each of the potential tax consequences that would result from trading the various combinations of the assets/liabilities; and c) displaying the potential proceeds and the potential tax consequences in a graphical format.

In an advantageous implementation of the method of the present invention, the method further includes the step of automatically trading one of the subsets of assets/liabilities based upon a desired tax consequence selected by the user.

According to yet another advantageous implementation of the method of the present invention, the method further includes the step of displaying the series of sums in a graphical format, in which one axis represents the potential proceeds and the other axis represents the potential tax consequences from selling the assets/liabilities, in which each potential trade of a particular subset of the assets/liabilities is plotted as a point in the graph, and each point has an attribute related to both a potential proceeds and a potential tax consequence resulting from a trade of the associated particular subset of assets/liabilities.

According to yet another aspect of the present invention, the method further includes the step of maintaining an association of each asset/liability to each of the points plotted in the graph displayed to the user.

In another advantageous implementation of the above method of the present invention, the method further includes the step of displaying the series as above, but displaying it with respect to each security owned by the user as a separate security noted on a graph on a three dimensional array, where one axis represents the capital gain or loss and the other axis represents proceeds from selling the securities and the third axis shows that representation for each particular issue of security.

Yet another particularly advantageous implementation of the above method of the present invention includes the step of enabling the user to select one of the points in the graph being displayed and then identifying to the user which of the securities must be sold to obtain a desired tax treatment.

Further, the method of the present invention also includes the step of highlighting significant points and lines in the graph. In this embodiment of the method of the present invention, the significant points include a maximum potential gain, a maximum potential loss, and a point where the proceeds are maximum while remaining tax neutral, and a point where the proceeds are maximum. The significant lines include where potential proceeds are realized with a zero tax consequence, where potential proceeds can be received with a specified amount of potential tax consequence, and where potential tax consequences can be achieved with a specified amount of potential proceeds.

According to yet another aspect of the present invention, the method further includes the steps of maintaining a basis and date of acquisition for each of the assets/liabilities in the portfolio, obtaining a trading price for each of the assets/liabilities in the portfolio, and displaying the potential proceeds and the potential tax consequences on a graph. In the graph, one axis represents the potential proceeds and another axis represents the potential tax consequence that would result from trading particular subsets of assets/liabilities, in which each potential trade of a particular subset of the assets/liabilities is plotted as a point in the graph, and each point has an attribute related to both a potential proceeds and a potential tax consequence resulting from a trade of the associated particular subset of assets/liabilities. The method further includes the steps of maintaining an association of each security to each of the points plotted in the graph, enabling the user to select one of the points in the graph thereby indicating the user's desired tax consequence and desired proceeds, identifying to the user which of the assets/liabilities must be traded to obtain the user's desired tax consequences and desired proceeds, and then executing a trade of the assets/liabilities identified upon confirmation by the user.

Another implementation of the method of the present invention includes the steps of enabling the user to indicate a desired proceeds and outputting a list of assets/liabilities to sell to obtain the desired proceeds while incurring a potential tax consequence.

According to yet another implementation of the present invention, the method further includes the steps of: d) determining for each security (on a share, or fractional share basis, if necessary) whether the security has been held for a sufficient time to qualify for long-term capital gain treatment (determined by comparing the date of acquisition of such security with the date of expected sale of such security and calculating whether the difference is sufficient to so qualify) and e) showing as (I) two separate graphs the tax-cash positions for short-term and long-term capital tax treatment or (ii) one composite graph of two such graphs superimposed on each other or (iii) one graph the combined effect utilizing then applicable tax rules showing the results of a combination of various sales involving both short and long-term capital asset qualified securities or (iv) a three dimensional graph showing long-term capital gain or loss or one axis, short-term capital gain or loss on another axis and proceeds to be realized on a third.

According to yet another implementation of the present invention, the method further includes enabling the user to time shift the portfolio by specifying a date and having the capital gain or loss reflected in the portfolio and current prices transformed to long-term gain from short-term gain as time is deemed to be passing regarding the portfolio's holdings. This would be accomplished by having the database note the date of acquisition of the underlying security trade. The database would also determine the date, according to then current tax rules as provided in the program running the current invention (which such program could be updated by accessing a web site that updates the program embodying the current invention), or with such dates as inputted from the user or as downloaded or accessed from a source such as a web site that updates the program embodying the current invention or that maintains the database, as to when the asset would be held sufficiently long enough to qualify for long-term capital gains treatment. In this manner, the tax consequences display presented to the user can be time shifted to indicate the consequences that would occur if sales were made at times subsequent to the current date at which the program is running.

According to yet another implementation of the present invention, the method further includes a time-based tax-price differential calculator. This calculator would determine the tax savings resulting from the passage of time in the conversion of short-term gains to long-term gains in the event of a sale of a security and determine the reduction in price from current price levels that would be needed to offset the tax savings. In this manner, a user can quickly determine the potential gain from waiting to engage in a transaction that would produce a long-term capital gain instead of a short-term capital gain and the per share reduction in price that would have to occur from current price levels to eliminate the after-tax benefit resulting from such transformation. By way of example, a user may own a share of a security currently trading at $300 with a basis of $50. If that share when sold would generate a short-term taxable gain, with an assumed tax rate of 40%, then the tax would be $100 when the share was sold (($300 (the current sale price) minus $50 (the basis)) times 40% equals $100), with $200 of after tax proceeds being realized ($300 minus the tax of $100). By contrast, if the share when sold would generate a long-term taxable gain taxed at, say, only a 20% rate, then the tax would be only $50 when the share was sold (($300–$50) times 20%=$50), with $250 of after tax proceeds being realized ($300–$50). Consequently, the share would have to fall in price to $237.50 ($237.50–($237.50 –$50)*20%= $200) from $300 to have made it worthwhile to have sold now and recognize short-term capital gains rather than waiting, if possible, until the gain was long-term (not taking into account the time value of money, which could also be included). Many investors would find it very surprising—in fact extraordinarily surprising—to realize that, in this example, a share owned by the investor would have to decrease from $300 to under $240 just to compensate for the tax differential. The ability to quantify and visualize this differential will be very valuable to investors.

According to yet another implementation of the present invention, the method further includes the steps of exporting the information regarding securities sold pursuant to the steps in the preceding paragraphs to a tax program, such as Intuit's TurboTax® or Kiplinger's TaxCut®, in a format that automatically inserts such information in the appropriate places for inclusion in such programs for reporting to the appropriate governmental agencies.

According to yet another implementation of the present invention, the method further includes the steps of receiving information from a tax program, such as Intuit's TurboTax® or Kiplinger's TaxCut®, and comparing it to the database information described above to identify potential tax savings from engaging in a transaction involving any of the capital assets in the database.

The present invention also includes a computer based program for enabling a user to manage his/her tax consequences from trading assets/liabilities held by the user. The program includes a tax basis registry storing a basis for each asset/liability upon entry of the asset/liability into the program by the user. In addition, the program includes a tax consequence calculator routine calculating a potential tax consequence for each asset/liability in the registry selected by the user for potential trade. Further, the program has a tax graph calculator routine calculating a graphical representation of an overall tax consequence for each possible combination of trade sale of the selected assets/liabilities. Finally, the program includes a graphical user interface interacting with the user to enable the user to enter basis, date of acquisition, and other information for each asset/liability to be managed by the program, to enable the user to select specific assets/liabilities for potential sale, and to enable the user to indicate a desired tax consequence, said graphical user interface further displaying the graphical representation of the tax consequence calculated by the tax graph calculator routine, listing assets that must be traded to meet the tax consequences desired by the user, and enabling the user to authorize trading of the specific assets/liabilities (which could be pursuant to a limit order, market order or otherwise), and providing the user confirmation of the trade of the specific assets/liabilities.

Another particularly advantageous implementation of the above system of the present invention provides for a means of calculating the expected tax required to be paid, or expected tax benefit or credit expected to be earned, in connection with any transaction or proposed series of transactions. The system would include an estimate from the user or from a program such as Intuit's TurboTax® as to the marginal tax rate of the user and then calculate the tax effect based on the capital gain or loss (short or long term) at that marginal rate.

According to yet another implementation of the above system of the present invention, the system would interact with a program that calculates the taxable effect of a transaction based on the other taxable transactions, income and other taxable items known to the user or expected to be engaged in by the user, either as stored in a program such as Intuit's TurboTax® or otherwise inputted into the program by the user.

According to yet another implementation of the above system of the present invention, the system would also employ an "expert agent" for managing the tax effects and alerting the user to various strategies that the user may wish to employ. Specifically, the present invention incorporates a system that monitors the user's tax position by comparing the capital tax effects from various proposed or available transactions and determining whether any such transactions achieve goals set by the user, including specified levels of capital gain or loss (short and/or long term), specified levels of proceeds, or specified levels of taxable effects. The system then alerts the user as to the satisfaction of such goals by a pop-up window, by an e-mail alert, by providing a notice in a file, or through any of a number of other known means for communicating with a user of a computer program, that such a transaction can now be accomplished. The user can then act, or not, on the information provided. The system can also be set by the user to send an order to the electronic trading system (described below) to execute the transaction identified by the "expert agent" with or without any user intervention. In this manner, the user can satisfy various tax-cash goals automatically with transactions being executed automatically. Similarly, the system can be configured so that a specified amount of securities are sold each month or week, with the system doing so in a manner that attempts to reflect a specified tax goal, such as sell those securities that result in $500 of proceeds and that produce the smallest taxable gain, or the largest loss, etc. while maintaining a reasonably diversified portfolio.

The present invention also includes a system for enabling a user to determine the tax consequences from trading multiple assets/liabilities within a portfolio of assets/liabilities and to obtain a desired tax consequence. The system of the present invention includes a processor determining the potential tax consequences that would result from trading various combinations of the assets/liabilities. Each of the plurality of potential tax consequences represents the potential tax consequence that would result from trading one particular subset of assets/liabilities. The processor also determines the potential proceeds for each of the potential tax consequences that would result from trading the various combinations of the assets/liabilities. The system includes a display coupled to the processor for displaying in a graphical format the tax consequences and the proceeds corresponding with each of the tax consequences determined by the processor. Further, the system includes a user input device being coupled to the display indicating a user desired tax consequence, and a portfolio manager being coupled to the user input device and enabling a user to prepare a trade of assets/liabilities to obtain a user desired tax consequence.

One particularly advantageous implementation of the above system of the present invention includes an electronic trading system being coupled to the portfolio manager, wherein the portfolio manager forwards the trade of the assets/liabilities to the electronic trading system, which executes the trade. In this case, the electronic trading system passes trading information regarding the assets/liabilities to the portfolio manager.

Another particularly advantageous implementation of the above system of the present invention provides that the display displays the potential proceeds and the potential tax consequences on a graph with one axis representing the potential proceeds and another axis representing the potential tax consequence that would result from trading particular subsets of assets/liabilities. In this graph, each potential trade of a particular subset of the assets/liabilities is plotted as a point in the graph, and each point has an attribute related to both a potential proceeds and a potential tax consequence resulting from a trade of the associated particular subset of assets/liabilities.

Yet another particularly advantageous implementation of the above system of the present invention includes a database for maintaining an association of each asset/liability to each of the points plotted in the graph that is displayed to the user. The database, if linked to a server, could also be associated with other information regarding the security (such as an analyst report, or 10-K, etc. so that when the security is shown the user could also obtain other information about the security).

Another particularly advantageous implementation of the above system of the present invention provides a user selection routine enabling the user to select one of the points in the graph being displayed, and the processor further comprises a routine identifying to the user via the display which of the assets/liabilities must be traded to obtain a desired tax consequence and a corresponding desired proceeds.

Yet another particularly advantageous implementation of the above system of the present invention further includes a database maintaining a basis and acquisition date for each security in the portfolio. The portfolio manager obtains a selling price for each of the securities in the portfolio. The display displays the potential proceeds and the potential tax consequences on a graph with one axis representing the potential proceeds and another axis representing the potential tax consequence that would result from trading the various subsets of assets/liabilities. Each potential trade of a particular subset of the assets/liabilities is plotted as a point in the graph, and each point has an attribute related to both a potential proceeds and a potential tax consequence resulting from a trade of the associated particular subset of assets/liabilities. The database maintains an association of each security to each of the points plotted in the graph displayed to the user. The user input device enables the user to select one of the points in the graph being displayed thereby indicating the user's desired tax consequence and corresponding desired proceeds. The portfolio manager identifies for the user which of the assets/liabilities must be traded to obtain the desired tax consequence and corresponding desired proceeds, and executes a trade of the assets/liabilities identified upon confirmation by the user and confirms such trade to the user.

According to yet another aspect of the present invention, an apparatus for enabling a user to determine capital asset tax consequences from selling securities within a portfolio of securities and to obtain a desired capital asset tax consequence and a desired proceeds, includes a calculating means, a determining means, an obtaining means, and a display means. The means for calculating calculates a potential capital asset tax consequence and a potential proceeds resulting from trading each of the securities. The means for determining determines a series of sums of the capital asset tax consequences that would result from various combinations of trades of particular subsets of the securities. The means for obtaining obtains the potential proceeds associated with each of the series of sums resulting from the various combinations of trades of the particular subsets of the securities used by the determining means. The means for displaying displays to a user in a graphical format the series of sums and the associated potential proceeds in a graphical format. In this graph, one axis represents the capital asset tax consequence and another axis represents the proceeds resulting from trading the securities. Each of the sums is plotted as a point in a graph, and each point has an attribute related to a potential capital asset tax consequence and another attribute related to the potential proceeds resulting from a trade of the securities underlying each of the points.

Another particularly advantageous implementation of the above device of the present invention further includes a means for executing a sale of the securities identified upon affirmation by the user and to be able to confirm the sale of the particular securities selected by the user.

Yet another particularly advantageous implementation of the above system of the present invention further includes a means for continuously updating the graph both upon receipt of new market data regarding the securities in the portfolio or upon a change in the securities comprising the portfolio (including when securities are sold pursuant to the use of the present invention). The system could also be updated to reflect changes that are incorporated in new versions of the program that may be accessed at that time to reflect changes in tax rates, tax policies or other relevant factors.

Yet another particularly advantageous implementation of the above device of the present invention further includes a means for distinguishing between longterm and short-term capital gain and loss, and depicting the two as two separate graphs or a superimposed combination of graphs or by combining the two types of capital asset gain or loss (i.e., short or long) according to then applicable tax rules to create a combined net effect for various combinations of sales.

According to yet another particularly advantageous embodiment of the present invention, the above device includes a means for maintaining an association of each security to each of the points plotted in the graph being displayed to the user, and a means for enabling the user to indicate a desired tax consequence by selecting one of the points in the graph and identifying for the user which of the securities must be sold to obtain the desired tax consequence

DETAILED DESCRIPTION

Figure 1:
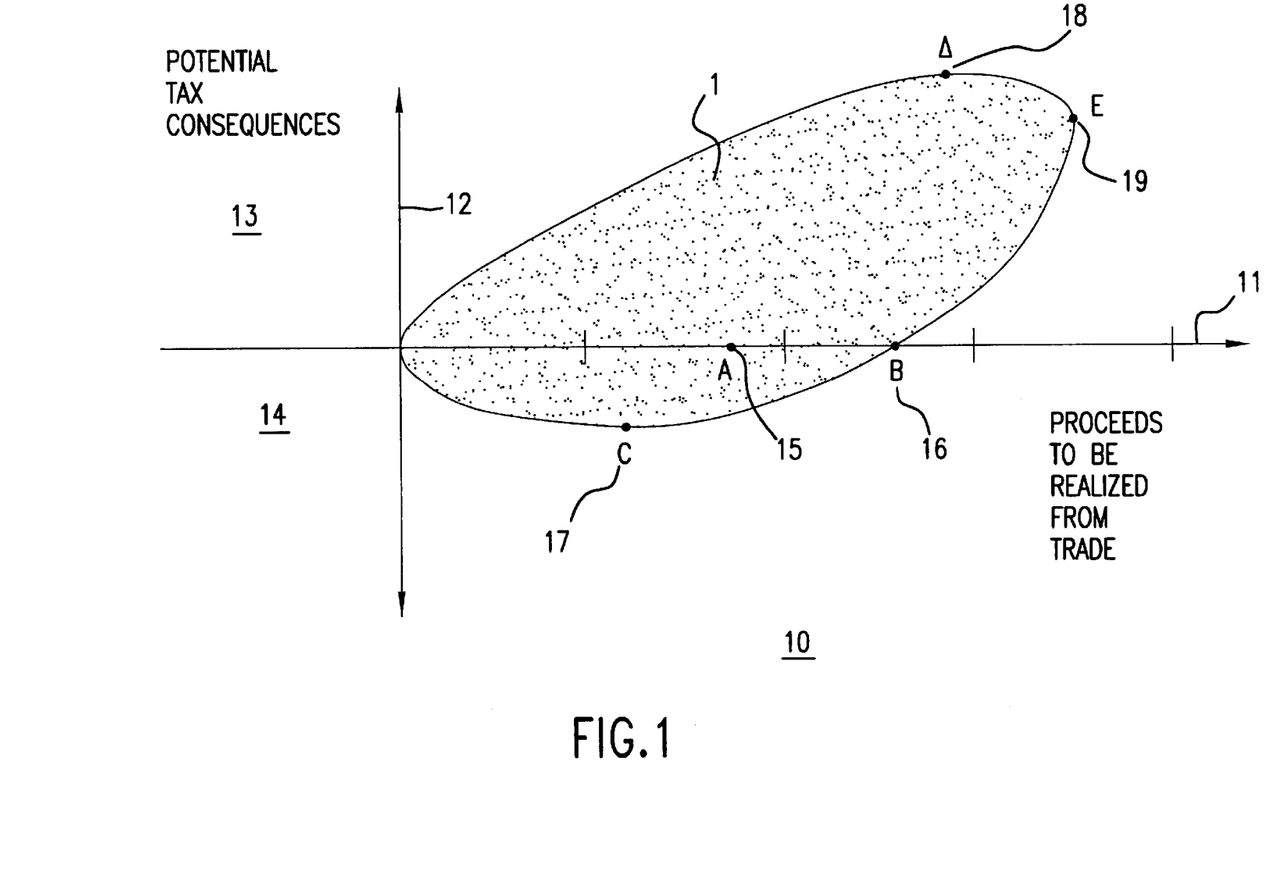
FIG. 1 depicts an exemplary graph presented to a user by the system of the present invention.

Referring to FIG. 1, shown therein is a graph 10, in which the horizontal axis 11 represents the proceeds (e.g., money, or value) to be realized from the sale of assets/liabilities (e.g., securities) in the portfolio. While the discussion below focuses on securities, the system described herein is applicable to any asset/liability or fungible product that can be traded, and for which there are potential tax consequences (e.g., capital asset taxes and income taxes, including those of the federal, state, local and even foreign variety) from such trading. The vertical axis 12 represents the capital gain or loss (which can be either short-term or long-term) to be realized from the sale of the securities in the portfolio. The vertical axis could also represent the actual tax from the taxable gain or loss of the security, as opposed to the total taxable gain or loss. In other words, if the capital gains rate applicable to that security was 20%, then the dollars represented on the vertical axis would be the actual tax payable from the sale, which would be about 20%, of the taxable gain.

Furthermore, for simplicity purposes we assume the case where the sale cannot result in a negative cash realization, e.g., covering a short sale after the stock has appreciated. However, instances of negative cash realization, i.e., where the investor must actually pay money to get out of the investment, are indicated to the left of the vertical axis. The upper left quadrant 13 depicts instances when both negative cash realization and capital gains occur, while the lower left quadrant 14 depicts those instances when there is negative cash realization coupled with capital loss.

When the user clicks on any point in the curve 1 plotted in graph 10, the system identifies the closest match of shares the user should sell to realize the cash and capital gain or loss the user desires. The user is then prompted to accept the choice and the system will execute the sales for the user. Alternatively, the user can override the selection and make another choice.

As an example, if the user clicks on "A" 15, the system confirms with the user and then accesses the trading routine, which sells the right number and type (where you have a gain or a loss) of securities so that no capital gain or loss occurs, i.e., there would be no tax on the transaction, but the user would realize, say $10,000 in cash proceeds (which could also include a deduction for any transaction costs). At "B" 16, the user would realize no capital gain or loss (i.e., no tax on the transaction), but $20,000 in cash. At "C" 17, the user would realize the maximum capital loss that could be realized from sales of the securities in the system, say $4000, with cash realized of, say $8000. At "D" 18, the user would realize the maximum capital gain one could realize from the sales of the securities in the system, say $8500, with cash realized of, say $16,500. At "E" 19, the user would realize the maximum amount of cash, say $25,000, that could be realized from the sales of all securities in the system, with a resulting capital gain of, say $5500.

To determine the various points in the graph, the system calculates the proceeds that can be realized and the gain or loss for each security (on a share, or fractional share if appropriate, basis) held in the portfolio. The proceeds are determined by multiplying the expected sales price for each security times the number of shares of each such security. The individual gain or loss is determined by subtracting the basis for each security (on a share, or fractional share if appropriate, basis) from its current price. For example, if the user bought 10 shares of Motorola at $40.00 per share total cost, then the basis in each of those 10 shares is $40. If the current price for each share is $60.00, then the potential capital gain is $20 for each of those identified 10 shares and the total proceeds to be realized will be $60 per share sold. To determine the appropriate tax formula to apply to the potential gain, the system must track the date on which the securities were purchased, and be told whether the trading was part of a trade or business. This determines whether the gain is a capital gain or ordinary income, and if capital whether a short-term capital gain, or a long-term capital gain. The appropriate formulas are well-known to those in this art, and will not be described in detail herein to keep the discussion brief.

By doing so for all of the securities (on a share, or fractional share if appropriate, basis) and summing up all of the gains and the proceeds realizable by a sale of all the shares for which there is gain, the system determines point "D" 18. (If there are sales that generate no tax, then point "D" 18 would actually be a short horizontal line showing that the proceeds can be somewhat increased or decreased while maintaining the maximum capital gain amount.) By surnming up all of the losses and the proceeds realizable by a sale of all the shares for which there is loss, the system obtains point "C" 17. (Again, if there are sales that generate no tax, then point "C" 17 would actually be a short horizontal line showing that the proceeds can be somewhat increased or decreased while maintaining the maximum capital loss amount.) By summing up all of the proceeds that can be realized from the sale of all the securities, regardless of whether there are losses or gains or no tax, the system obtains point "E" 19. Point "B" 16 can be determined in a variety of ways such as by summing separately all gains and all losses, taking the lesser amount and matching (in the sense of "using up" such gains or losses) all the sales that generate such gains or losses with sales that generate the maximum proceeds and have the opposite tax result, and then adding proceeds from sales that generate no tax and determining the overall proceeds from all such sales. Point "A" 15 is determined by matching a gain with a loss and adding any sales for which-there is no tax, until the total sale reaches the point on the axis represented by "A" 15.

According to the present invention, the underlying securities in the graph could be all of the securities in the portfolio, or a subset of them. For example, the user could decide he wished to sell all of his high technology stocks, but wanted to do so only if it could be done without creating a capital gain. The system then creates the graph 10 in FIG. 1 using only those selected securities. The user can even select only one security, such as Motorola. In this case, the system then uses only that security in the user's portfolio as the underlying data.

Once the user selects the securities to be sold, the system determines the graph 10 in FIG. 1 by plotting the various combinations of sales of the securities. Once plotted, the user can then select how much money the user requires and if the underlying data permits it, sell the correct lots of securities to obtain the desired cash with the desired tax treatment (e.g., tax neutral).

The calculations can be simplified by asking the user whether the user desires a tax neutral sale, in which case only the points that occur on the x=0 axis need be calculated. Furthermore, if the user also requests a specific amount of cash from a tax neutral sale, then the calculation is even simpler in that a specific coordinate has now been specified. To obtain this coordinate, the system matches positive capital gains with negative ones until the amount of the sale reaches the amount requested. Obviously, this may not always be possible, such as if a portfolio has been in existence for many years, and all the user's assets have appreciated in value and therefore the user has only capital gains and realization of a certain amount of cash would not be possible without incurring a gain.

In addition, there may be multiple securities combinations associated with any specific point. For example, point "A" 15 may be represented by the sale of $6,000 worth of shares of security X and $4,000 worth of security Y, or by $10,000 worth of security Z, etc. The system could determine to show just one combination, or multiple combinations, once the user selected the preferred tax-cash outcome. Any combinations shown by the system once the user clicked on the applicable point could then be selected by the user clicking on the specific shown combination. Alternatively, the system itself could contain various algorithms that would pre-select the combinations to be shown to the user, such as algorithms designed to keep the relative weights of the securities held in the portfolio as constant as possible, or to eliminate all of one security to the extent possible to simplify the portfolio, etc.

In addition, the graph and the system can be further refined to distinguish between capital gain and loss that is short-term and long-term. Because the system could maintain a record of the date at which a security (on a share, or fractional share basis, if necessary) was acquired, the determination of short and long-term capital gain and loss would be determined from that information combined with the expected sales price and tax basis information. The system could display two graphs (one for short and the other for long-term capital gain and loss), or one graph combining the effects of each (utilizing then current tax rules to depict then permitted offsetting of long-term and short-term capital gain and loss positions). The two graphs could also be superimposed to create a composite graph showing the separate effects together on one set of axis. Alternatively, one graph could be modified to include a third axis forming a three dimensional graph, in which the third dimension included short-term capital gains while the other dimensions included proceeds and long-term capital gains. The system would also note the transactions entered into the system to date, in order to keep track of short and long term gains already realized in determining what could be realized on a forward-looking basis.

Yet another alternative embodiment is possible. This embodiment uses one axis to represent the actual taxes to be paid, while the remaining axis depicts the proceeds to be derived from the sale. To determine the taxes to be paid, one merely performs the all too well-known capital gains tax calculations, which can be done by software products, such as TurboTax,™ for example.

Figure 2:
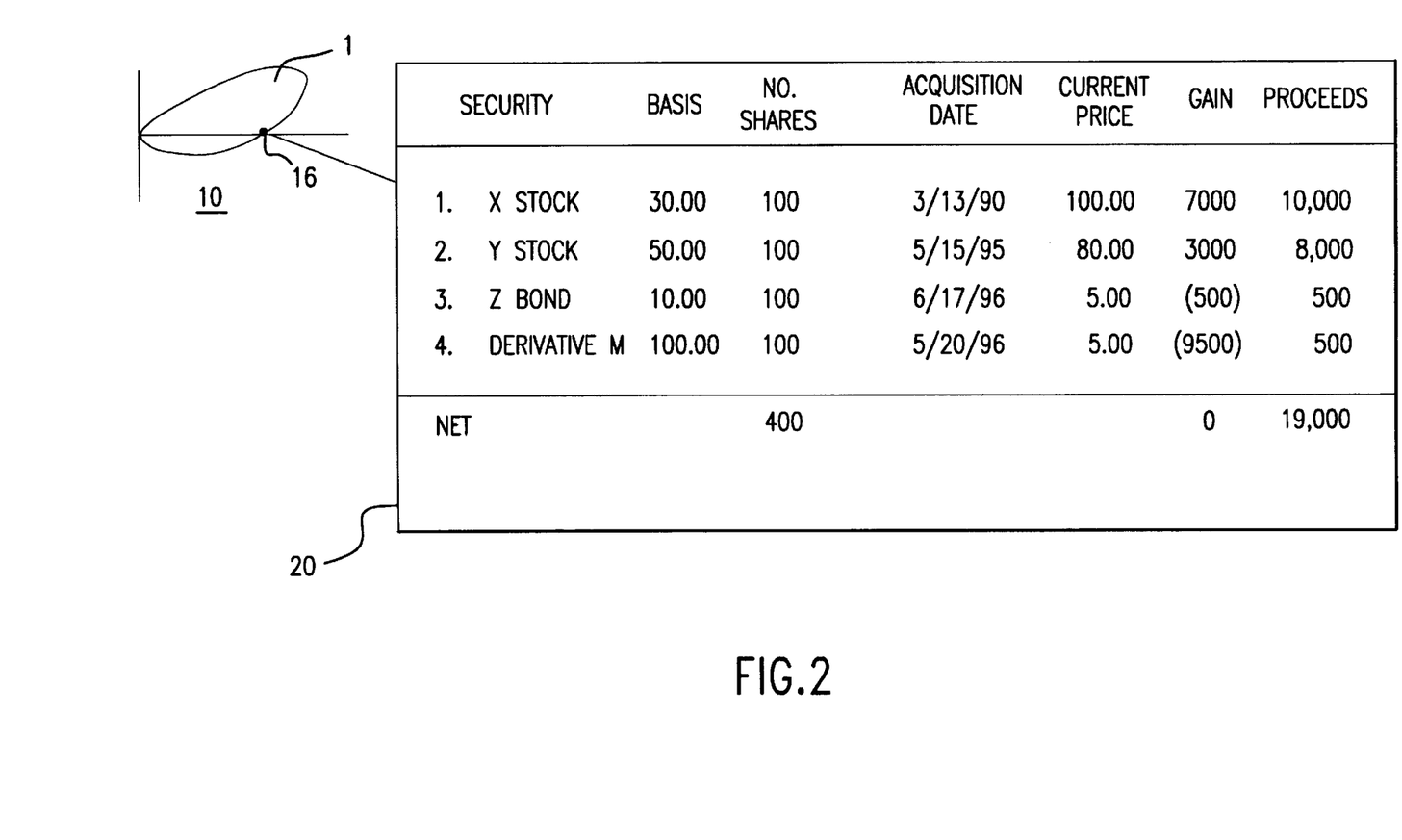
FIG. 2 depicts the relationship between the data underlying the points represented by the graph in FIG. 1 according to one exemplary embodiment of the present invention.

Underlying the display of the tax consequences is a link to a table or database that maintains an association between each point on the graph and the combination of trades required to achieve the indicated results. FIG. 2 depicts the link between the graph and the underlying data, which is presented to the user in the form of a table. For example, by selecting point "B" 16, which is the point at which the most money is realized without incurring a capital gain, the user activates the link maintaining the association between point "B" 16 and the data representing point "B" 16. The system then displays a table 20 of the data representing point "B" 16 to the user.

Referring to FIG. 2, the table includes a list of securities, the basis for each security, the number of shares of each security, the date the securities were acquired, the current trading price for each security, a potential gain for each security, and a potential proceeds for each security. As the table must be updated as the pricing for each security changes, the table will not necessarily agree precisely with the actual results achieved; however, absent a rapidly changing market, the actual results should not be materially different from the user's desired results, and the user can specify that the trades shall be made as limit orders, or only if the price is within specified ranges or percentages (such as within 95%–105%) of the current prices for each security.

In the example shown in FIG. 2, the user selected point "B" 16, which exposed Table 20. This table 20 has four entries—Stock X, Stock Y. Bond Z and Derivative M. The basis in Stock X is shown as $30.00 and the user purchased 100 shares of Stock X on Mar. 13, 1990. Currently, the stock is trading at $100, which means the user has a potential gain of $7000, and the potential proceeds would be $10,000. When examining each of the securities, it becomes apparent that the net gain/loss is zero, but the proceeds are $19,000. As a result, the user can sell these four securities and realize $19,000 without paying any taxes.

Although, for simplicity purposes we have indicated round lots of shares, the present invention is applicable to small lots, odd lots, and fractional shares, as described in detail in U.S. patent application Ser. No. 09/139,020 which has been incorporated by reference.

Upon review of the "data" representing the selected point, the user can then issue an instruction to trade some or all of the assets/liabilities represented by the "data." For example, if the assets/liabilities were securities held by the user, then the data would be a list of securities, their purchase date, their tax basis and the existing price (e.g., at last closing). If the user approves the trade, then the system accesses the trading routine, which then performs the trade using the system described in the patent application mentioned above, which has been incorporated by reference. If the user wished to sell only half of his Stock X holdings, the table would allow the user to select Stock X, specify the amount to sell, calculate the gain to realized from that sale (and the proceeds) and update the graph to show the effect of such sale.

Figure 3:
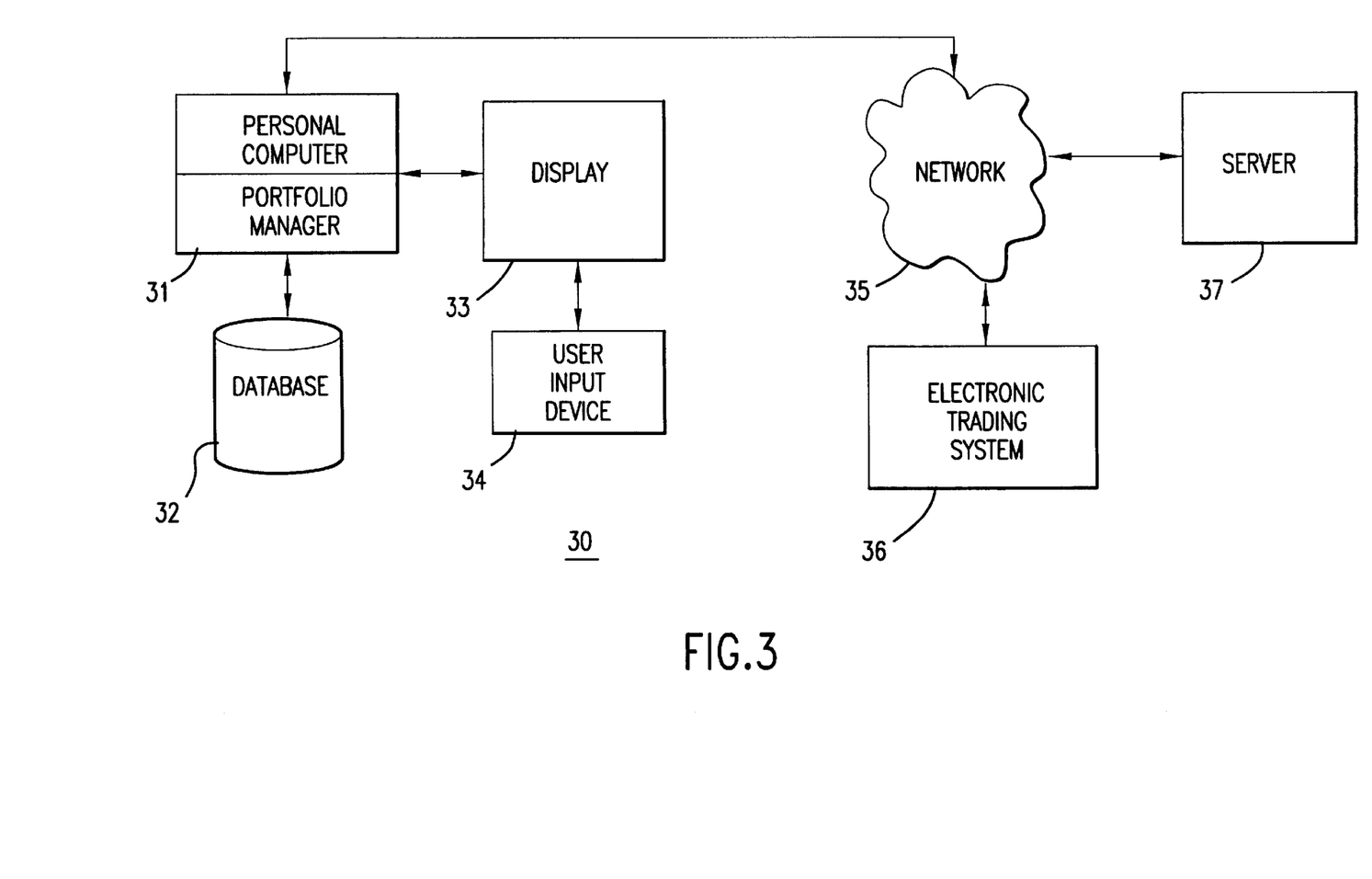
FIG. 3 depicts an exemplary embodiment of the system according to the present invention.

Referring to FIG. 3, the system 30 of the present invention includes a processor 31, such as a personal computer or the like, coupled to a database 32, such as a hard disk drive or the like, a display 33, such as a cathode ray tube or the like, and a user input device 34, such as a mouse, keyboard or touch or voice activated user interface or the like. The processor 31 is coupled to a central server 37 via a network 35, such as the Internet, which interacts with the portfolio manager program executing on the processor 31. The server 37 may include part of the portfolio manager or not, as explained in the above referenced patent application. Coupled to the network 35 and hence to the server 37 is an electronic trading system 36, which is well-known to those of skill in the art, and which performs the actual trading of the securities.

The user input device could include a voice activated user input, any of which are currently available.

Figure 4:
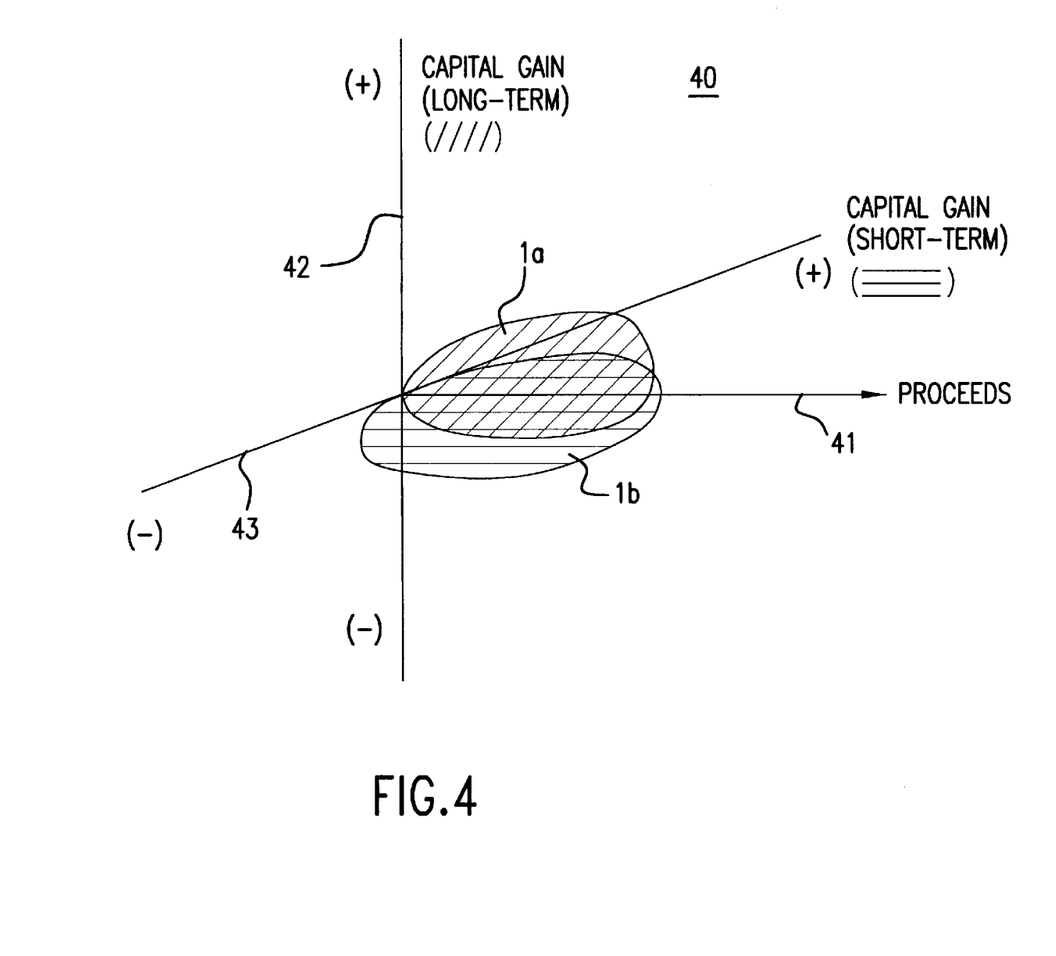
FIG. 4 depicts an exemplary graph presented to a user according to the present invention with three axes showing three different variables.

Referring to FIG. 4, shown therein is a graph 40, in which the horizontal axis 41 represents the proceeds (or money) to be realized from the sale of securities in the portfolio. The vertical axis 42 represents the capital gain or loss (long-term) to be realized from the sale of the securities in the portfolio and the third axis 43 represents the capital gain or loss (short-term) to be realized from the sale of the securities in the portfolio. Curve 1a represents the same information as curve 1 in graph 10 but only for long-term capital gain, and curve 1b depicts the same information as curve 1 in graph 10 but only for short-term capital gain. This graph 40 would operate in the same manner as the two-dimensional graph 10 described in FIG. 1 and would contain the same features (e.g., click on any point in the curves 1a and 1b depicted in graph 40, and the system will identify the closest match of shares the user should sell to realize the cash and capital gain or loss the user desires).

Figure 5:
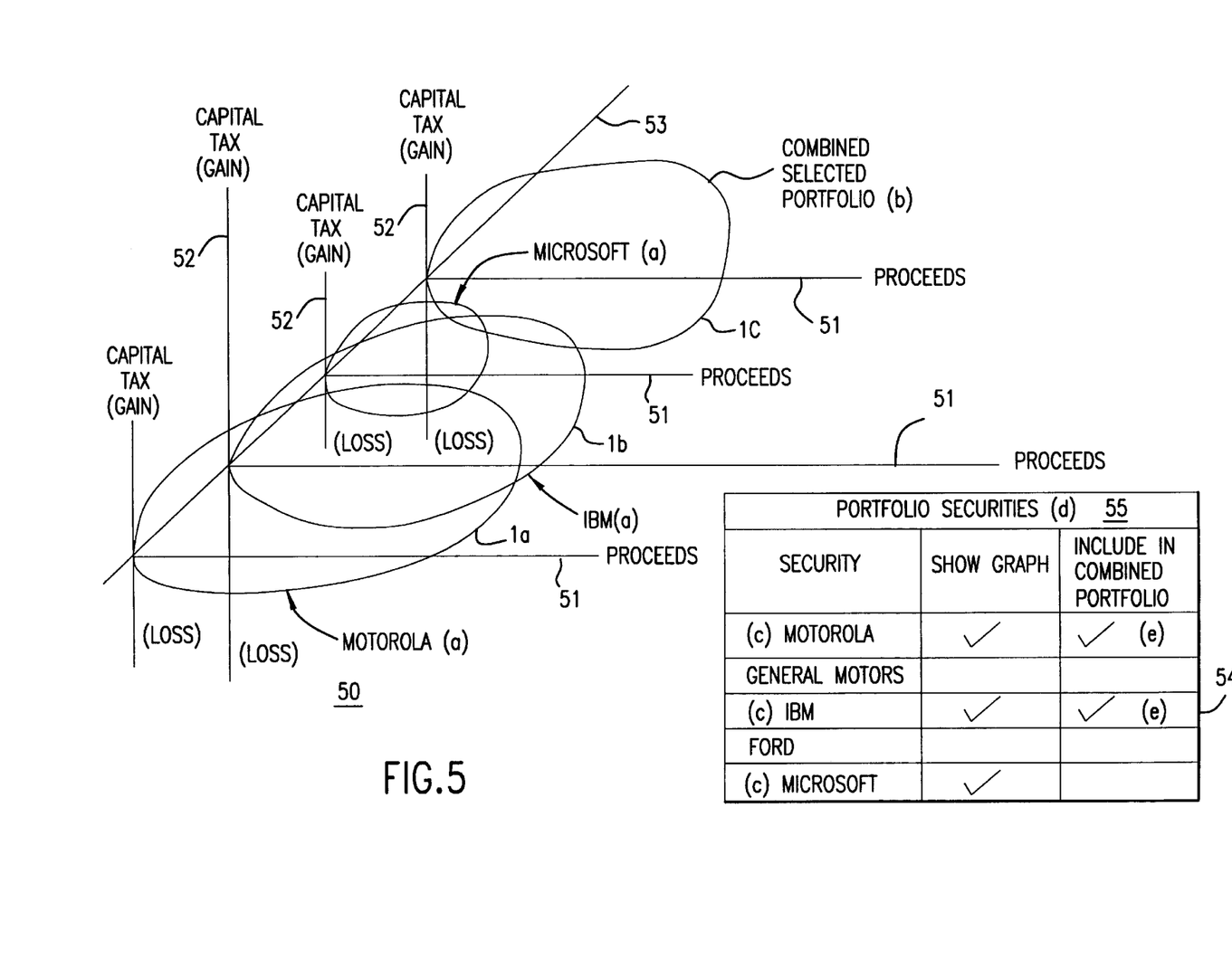
FIG. 5 depicts an exemplary graph presented to a user according to the present invention with three axes showing different securities on the third axis.

Referring to FIG. 5, shown therein is a graph 50, in which the horizontal axis 51 represents the proceeds to be realized from the sale of securities in the portfolio. The vertical axis 52 represents the capital gain or loss (short and longterm combined, although there could also be additional drawings on the graph 50 to represent only short or long term capital tax effects) to be realized from the sale of the securities comprising each of the specific security issues (a) in the portfolio. The third axis 53 is used to provide a three-dimensional placement to portray the effects of any selected securities issues combined capital gain or loss (short and/or long term effects) to be realized from the sale of the securities in the portfolio. Curve 1a represents the same information as curve 1 in graph 10 but only for a single security, which in this case is Motorola. Curves 1b and 1c represent similar information for securities IBM and Microsoft, respectively. The third axis could also show the same security issue (such as Microsoft), before and after a contemplated sale of some, but not all, of the Microsoft shares held by the user. This graph 53 would operate in the same manner as the two-dimensional graph 10 described in FIG. 1 and would contain the same features (e.g., click on any point in the curves 1a, 1b, 1c in graph 50, and the system will identify the closest match of shares the user should sell to realize the cash and capital gain or loss the user desires), but the user would be permitted easily to select transactions specifically by securities issue (a) instead of on a portfolio basis. In addition, a user could select any combination of securities issues to be combined into a combined selected portfolio graph (b) which would be the combined tax effects-proceeds for the securities issues chosen by the user. The user could select each issue to be graphed by clicking on the specific security in a list of securities 55, and select the securities to be included in the combined portfolio by selecting again from the list 54.

Figure 6:
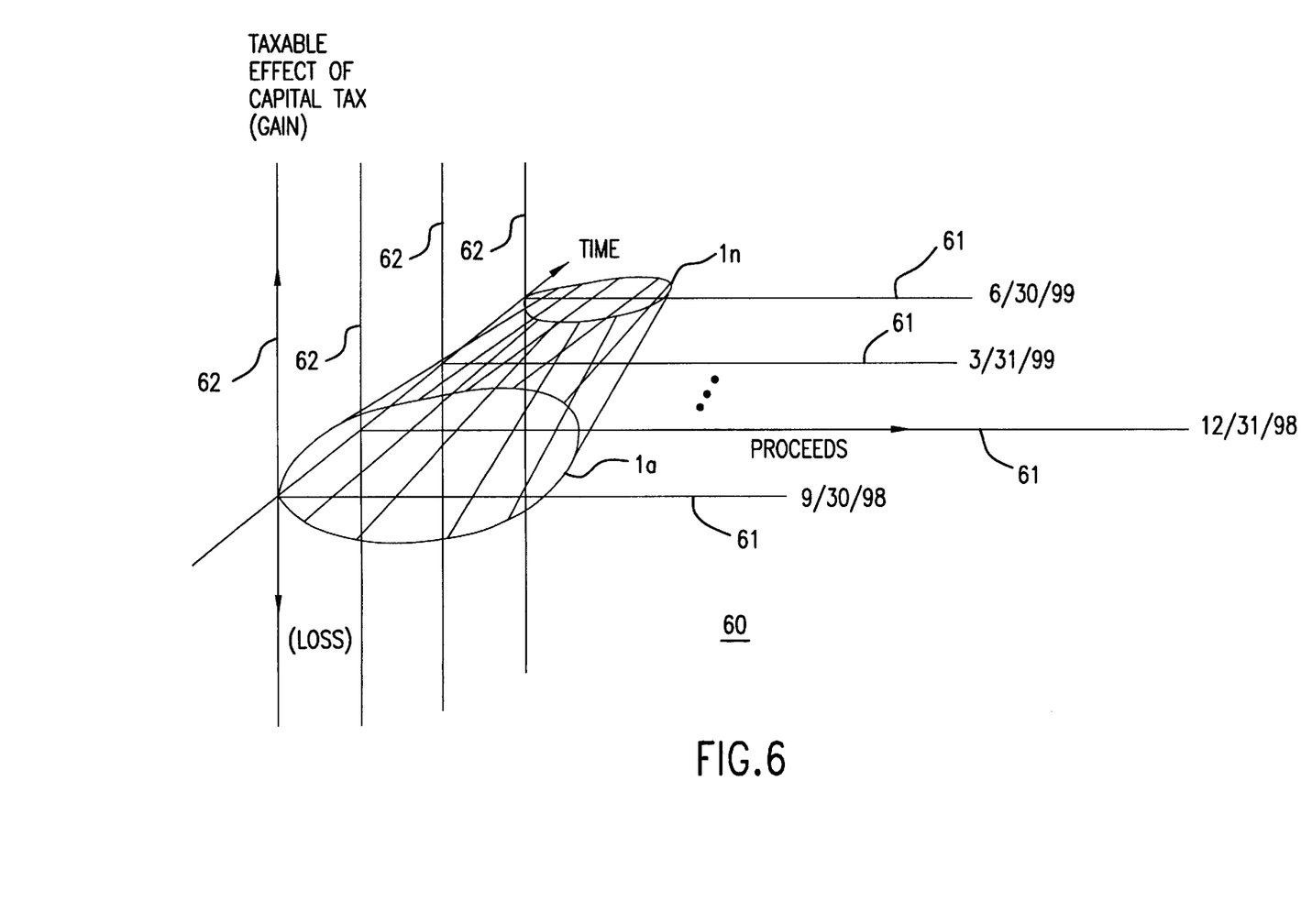
FIG. 6 depicts an exemplary graph presented to a user according to the present invention with three axes showing the effect of time on the tax consequences.

Referring to FIG. 6, shown therein is a graph 60, in which the horizontal axis 61 represents the proceeds to be realized from the sale of securities in the portfolio. The vertical axis 62 represents the taxable effect from the capital gain or loss (long and short-term) to be realized from the sale of the securities in the portfolio and the third axis 63 represents the passage of time. This graph 60 would operate in the same manner as the two-dimensional graph 10 described in FIG. 1 and would contain the same features (e.g., click on any point in the curves (1a . . . 1n) depicted in graph 60, and the system will identify the closest match of shares the user should sell to realize the cash and capital gain or loss the user desires). The graph 60 portrays the capital tax effects occurring from the transformation of short-term capital gain/loss to long-term capital gain/loss on the user's tax position, and shows how the passage of time will affect the tax consequences from possible transactions at current prices. User's are thereby able to visualize what could be significant tax effect differences resulting from waiting to engage in a transaction. For example, curve 1a depicts the same information as curve 1 in graph 10 at a point in time, such as Sep. 30, 1998. Curve 1n represents the same information but at a later point in time, i.e., Jun. 30, 1999. All the curves between 1a and 1n represent other dates between Sep. 30, 1998 and Jun. 30, 1999, e.g., Dec. 31, 1998 and Mar. 31, 1999.

Figure 7:
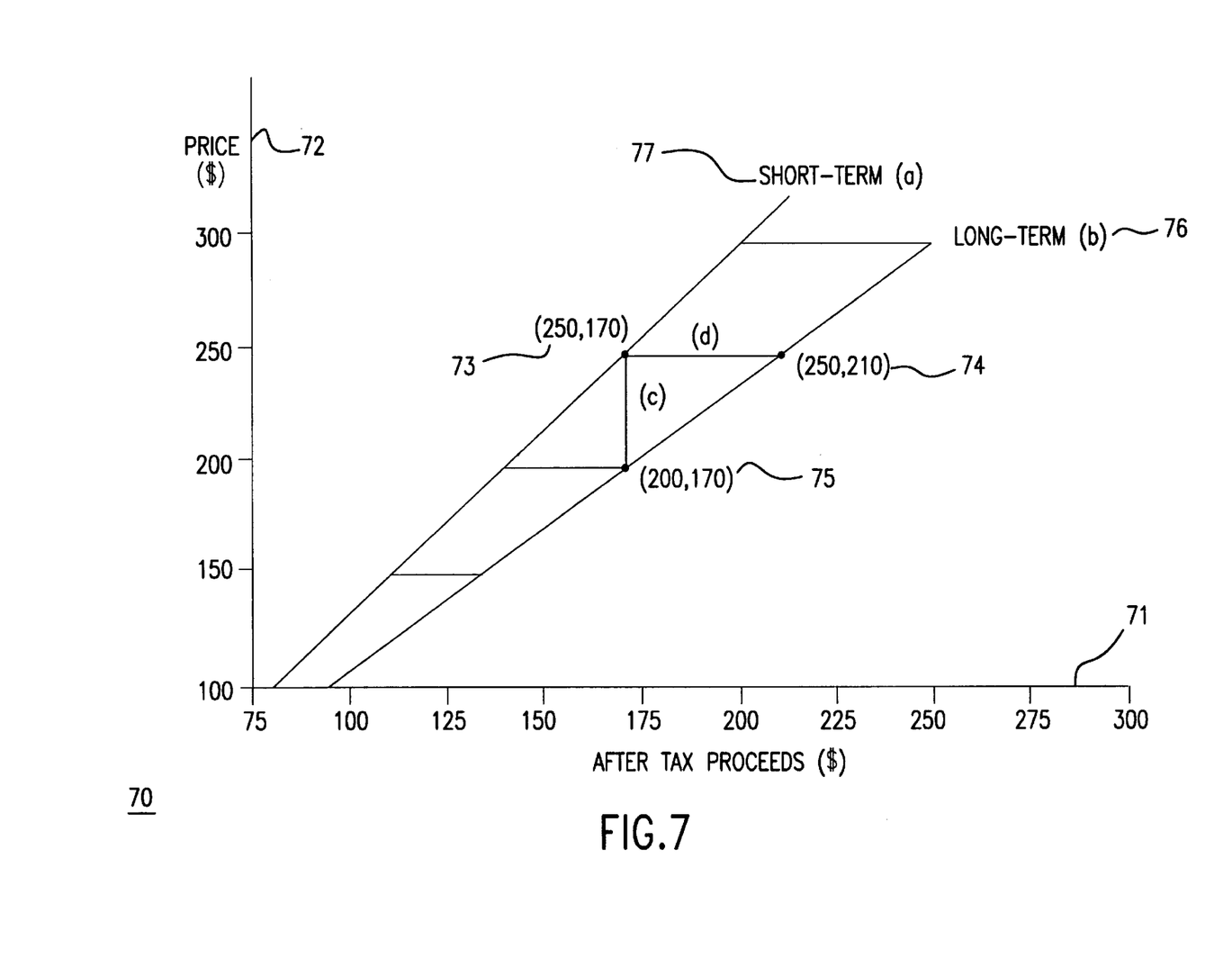
FIG. 7 depicts an exemplary graph presented to a user according to the present invention with two axes showing the price-time trade-off effect of converting from short to long term capital gain for an asset.

Referring to FIG. 7, shown therein is a graph 70, in which the horizontal axis 71 represents the proceeds to be realized from the sale of securities in the portfolio after taxes. The vertical axis 72 represents the price at which the security must be sold to realize such after tax proceeds indicating the prices from selling the security as a long term capital asset 76 (b) or as a short term capital asset (a) 77. Point 73 can be seen on the graph 70 showing a current price of, for example, $250 for the asset indicating that if it were sold as a short term asset the after tax proceeds would be $170, if it were sold as a long term-asset the after tax proceeds would be $210 (point 74) with the difference (d) being $40 and that the price would have to fall to $200 (point 75) from $250 (a $50 reduction (c)) before the benefits of waiting until the asset is long-term would be eliminated from the current price point of $250.

The system of the present invention takes into account applicable tax rules that may affect the calculation of capital gain or loss. These rules include the Wash Sale Rule and the computation of ordinary income on the sale of a bond having original issue discount or market discount. The system will also alert the user to areas where the tax law is not sufficiently well defined to permit application of a mechanical rule. In these situations, the system will recommend that the user consult a tax adviser.

Finally, although the description of the application of the invention above utilizes securities and capital asset tax consequences, the invention could be applied to any series of assets or liabilities that have tax effects or consequences. As used herein, tax effects or tax consequences refers to any of the following—capital gains, capital losses, ordinary gains, short-term capital gains, or long-term capital gains, federal, state, foreign and/or local income or capital gains taxes. Proceeds refers to any value derived from a trade of an asset or liability, including cash, credit, etc. Furthermore, as used herein, gains include positive gains as well as negative gains (i.e., losses). Assets/liabilities include any of the following: foreign or domestic securities, equities, options, warrants, mutual fund shares, commodities, bonds, notes, bills, derivatives, tradable assets or liabilities or any combination thereof, financial assets, limited partnership interests, private placement securities, foreign currencies, contracts, futures, bank loan syndication interests, debts, pollution rights, global warming rights, and insurance claim interests.

What is claimed is:

1. A method for providing management of taxable events, comprising:
   determining a proceeds and tax consequence that would result from trading each of various combinations of a plurality of assets/liabilities;
   displaying the proceeds and tax consequence from each potential trade in a computergenerated graph of at least two dimensions.

2. The method according to claim 1, further comprising trading a particular combination of assets/liabilities.

3. The method according to claim 1, further comprising trading a particular combination of assets/liabilities based upon at least one of a desired tax consequence and a desired proceeds.

4. The method according to claim 1, further comprising trading a particular combination of assets/liabilities based upon a desired combination of tax consequence and proceeds selected by a user by clicking on a point of the graph representing said desired combination of tax consequence and proceeds.

5. The method according to claim 1, wherein the graph has a first axis representing the potential proceeds and a second axis representing the potential tax consequence that would result from the potential trades of the various combinations of the plurality of assets/liabilities, each potential trade displayable as a point of the graph.

6. The method according to claim 1, wherein the graph has three axes, in which one axis identifies potential tax consequence, another axis identifies potential proceeds, and the third axis identifies time.

7. The method according to claim 1, wherein the graph has three axes, in which one axis identifies potential tax consequence, another axis identifies potential proceeds, and the third axis identifies particular assets/liabilities.

8. The method according to claim 1, further comprising maintaining an association of corresponding assets/liabilities to each of a plurality of points of the graph.

9. The method according to claim 1, further comprising enabling a user to indicate at least one of a desired potential tax consequence and a desired potential proceeds by selecting a point of the graph.

10. The method according to claim 1, further comprising enabling a user to indicate a desired potential tax consequence and a desired potential proceeds by selecting a point of the graph, and identifying to the user which of the assets/liabilities must be traded to obtain the desired tax consequence and desired potential proceeds.

11. The method according to claim 1, further comprising identifying which of the assets/liabilities must be traded to obtain a desired tax consequence and desired potential proceeds.

12. The method according to claim 1, further comprising identifying a specific potential tax consequence and a specific potential proceeds associated with a point of the graph.

13. The method according to claim 1, further comprising highlighting significant points of the graph.

14. The method according to claim 1, further comprising highlighting significant lines in the graph.

15. The method according to claim 1, further comprising determining a tax treatment for each asset/liability of a particular combination.

16. The method according to claim 1, further comprising displaying with the graph a tax treatment for each asset/liability of a particular combination.

17. The method according to claim 1, further comprising displaying with the graph a tax treatment for each asset/liability, the graph including one composite graph of two such graphs superimposed on each other.

18. The method according to claim 1, further comprising determining a change in tax consequences resulting from delaying a trade of a particular combination of assets/liabilities.

19. The method according to claim 1, further comprising determining a change in tax treatment resulting from delaying a trade of a particular combination of assets/liabilities.

20. The method according to claim 1, further comprising determining a change in tax consequences resulting from a passage of time in an event of a trade of a particular combination of assets/liabilities.

21. The method according to claim 1, further comprising determining a change in tax treatment resulting from a passage of time in an event of a trade of a particular combination of assets/liabilities.

22. A computer program product for managing taxable events, comprising:
   a tax basis registry that stores a basis for each of a plurality of assets/liabilities;
   a calculator routine that calculates a tax consequence and proceeds for a potential trade of each asset/liability in the registry selected for trading; and
   a graph creation routine that creates a multidimensional graphical representation of the potential tax consequences and the proceeds.

23. The computer program product of claim 22, further comprising a user interface that interacts with a user to enable the user to view a desired combination of tax consequences and potential proceeds.

24. The computer program product of claim 22, further comprising a transmission routine for transmitting a graphical representation of the tax consequence and proceeds for each potential trade.

25. The computer program product of claim 22, further comprising a list routine for listing assets/liabilities that must be traded to meet the tax consequences and potential proceeds desired by a user.

26. The computer program product of claim 22, further comprising an authorization routine for enabling a user to authorize a trade of specific assets/liabilities.

27. The computer program product of claim 22, further comprising a trade confirmation routine for providing a user with confirmation of a trade of specific assets/liabilities.

28. The computer program product according to claim 22, further comprising an inter-program routine that interacts with another computer program that calculates a taxable effect of a potential trade.

29. The computer program product according to claim 22, further comprising an expert agent that manages tax consequences and alerts a user to various strategies that the user may wish to employ.

30. The computer program product according to claim 29, wherein the expert agent monitors the user's tax position by comparing tax consequences from various proposed or available transactions and determining whether any such transactions achieve goals preset by the user.

31. The computer program product according to claim 30, wherein the goals include predetermined levels of at least one of long-term gain, long-term loss, short-term gain, and short-term loss.

32. The computer program product according to claim 30, wherein the goals include predetermined levels of proceeds.

33. The computer program product according to claim 30, wherein the goals include predetermined levels of taxable effects.

34. The computer program product according to claim 30, wherein the expert agent alerts the user as to the satisfaction of such goals by an e-mail alert.

35. The computer program product according to claim 30, wherein the expert agent alerts the user as to the satisfaction of such goals by a notice in file.

36. The computer program product according to claim 30, wherein the expert agent alerts the user as to the satisfaction of such goals.

37. The computer program product according to claim 29, wherein the expert agent sends an order to an electronic trading system to execute a transaction identified by the expert agent without any user intervention.

38. The computer program product according to claim 29, wherein the expert agent sends an order to an electronic trading system to execute a transaction identified by the expert agent with confirmation by the user.

39. The computer program product according to claim 29, wherein the expert agent sends an order to an electronic trading system to execute a transaction identified by the expert agent.

40. The computer program product according to claim 29, wherein the expert agent sends an order to an electronic trading system to execute a transaction.

41. A method for providing management of taxable events, comprising:
   obtaining a proceeds and tax consequence that would result from trading each of various combinations of a plurality of assets/liabilities;
   transmitting via a network the proceeds and tax consequence from each potential trade in a computer-generated graph of at least two dimensions.

* * * * *